United States Patent
Shibayama et al.

(10) Patent No.: US 9,732,547 B2
(45) Date of Patent: Aug. 15, 2017

(54) DOOR OPENING/CLOSING DEVICE AND VEHICLE DOOR MODULE

(71) Applicant: Aisin Seiki Kabushiki Kaisha, Kariya (JP)

(72) Inventors: Satoshi Shibayama, Nagoya (JP); Sadayuki Makino, Nagoya (JP); Hidefumi Katayama, Anjo (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/956,993

(22) Filed: Dec. 2, 2015

(65) Prior Publication Data

US 2016/0153225 A1   Jun. 2, 2016

(30) Foreign Application Priority Data

Dec. 2, 2014   (JP) .................................. 2014-244184

(51) Int. Cl.

| | | |
|---|---|---|
| *E06B 3/00* | (2006.01) | |
| *E05F 11/54* | (2006.01) | |
| *E05F 11/38* | (2006.01) | |
| *E05F 11/48* | (2006.01) | |
| *E05F 11/53* | (2006.01) | |
| *B60J 5/00* | (2006.01) | |
| *E05B 85/12* | (2014.01) | |
| *E05D 13/00* | (2006.01) | |
| *E05B 79/20* | (2014.01) | |
| *E05B 85/02* | (2014.01) | |

(52) U.S. Cl.

CPC .................. *E05F 11/54* (2013.01); *B60J 5/00* (2013.01); *E05B 79/20* (2013.01); *E05B 85/02* (2013.01); *E05B 85/12* (2013.01); *E05D 13/00* (2013.01); *E05F 11/382* (2013.01); *E05F 11/483* (2013.01); *E05F 11/535* (2013.01)

(58) Field of Classification Search

CPC .......... E05B 79/20; E05B 85/02; E05B 85/12; B60J 5/00; E05D 13/00; E05F 11/535; E05F 11/483; E05F 11/382; E05F 11/54

USPC ................................ 49/502, 503; 296/146.7

See application file for complete search history.

(56) References Cited

U.S. PATENT DOCUMENTS

| | | | | |
|---|---|---|---|---|
| 4,662,115 A | * | 5/1987 | Ohya ..................... | B60J 5/0413 49/502 |
| 5,492,379 A | * | 2/1996 | Staser ..................... | E05B 79/12 292/336.3 |
| 5,617,676 A | * | 4/1997 | Kleefeldt ............... | B60J 5/0416 49/502 |

(Continued)

FOREIGN PATENT DOCUMENTS

JP   2003-97122   4/2003

*Primary Examiner* — Jerry Redman

(74) *Attorney, Agent, or Firm* — Oblon, McClelland, Maier & Neustadt, L.L.P.

(57) ABSTRACT

A door opening and closing device includes: a resin-made base attached to an inner panel of a door; and a transfer mechanism provided on an interior side of the base, and transferring power to a locking device via a power transfer cable, wherein the base includes first and second parts in which the transfer mechanism and the cable are disposed respectively, and a fixing portion fixing an outer casing end portion of the cable, and wherein the first and second parts are configured to locate at different levels so that the second part is positioned closer to an inner side than the first part in a width direction, a step portion is provided between the first and second parts, and the fixing portion is provided in the step portion.

9 Claims, 6 Drawing Sheets

(56) References Cited

U.S. PATENT DOCUMENTS

| | | | | |
|---|---|---|---|---|
| 6,189,267 B1* | 2/2001 | Staser | ............. | B60J 5/0416 |
| | | | | 49/503 |
| 6,301,835 B1* | 10/2001 | Pfeiffer | ............. | B60J 5/0416 |
| | | | | 296/146.5 |
| 6,428,081 B1* | 8/2002 | Williams, Jr. | ............. | B29C 45/1671 |
| | | | | 296/146.1 |
| 6,969,108 B2 | 11/2005 | Fukumoto et al. | | |
| 7,627,988 B2* | 12/2009 | Takeda | ............. | B60J 5/0416 |
| | | | | 49/349 |
| 8,186,743 B2* | 5/2012 | Anderson | ............. | B60J 5/042 |
| | | | | 296/146.6 |
| 8,584,792 B2* | 11/2013 | Kriese | ............. | B60J 5/0418 |
| | | | | 181/207 |
| 2004/0244298 A1* | 12/2004 | Ogawa | ............. | B60J 5/0405 |
| | | | | 49/502 |
| 2006/0059784 A1* | 3/2006 | Carter | ............. | B60J 5/0416 |
| | | | | 49/502 |
| 2007/0001477 A1* | 1/2007 | Syed | ............. | B60J 5/0416 |
| | | | | 296/146.7 |
| 2007/0062123 A1* | 3/2007 | Kruger | ............. | B60J 5/0416 |
| | | | | 49/502 |
| 2007/0289222 A1* | 12/2007 | Papi | ............. | E05B 79/06 |
| | | | | 49/502 |
| 2008/0141592 A1* | 6/2008 | Nakajima | ............. | B60J 5/0416 |
| | | | | 49/502 |
| 2009/0145035 A1* | 6/2009 | Mangold | ............. | E05F 11/382 |
| | | | | 49/352 |
| 2010/0146862 A1* | 6/2010 | Lin | ............. | B60J 5/0416 |
| | | | | 49/502 |

* cited by examiner

DOOR OPENING/CLOSING DEVICE AND VEHICLE DOOR MODULE

CROSS REFERENCE TO RELATED APPLICATIONS

This application is based on and claims priority under 35 U.S.C. §119 to Japanese Patent Application 2014-244184, filed on Dec. 2, 2014, the entire contents of which are incorporated herein by reference.

TECHNICAL FIELD

This disclosure relates to a door opening/closing device and a vehicle door module.

BACKGROUND DISCUSSION

As a door opening/closing device, for example, a technology described in JP 2003-97122A (Reference 1) is known.

The door opening/closing device transfers power of a lever which is operated by an operation of an inner handle to a locking device via a cable.

Such a door opening/closing device is attached to an inner panel of a vehicle door via an iron base.

However, it is necessary to reduce the weight of the door opening/closing device.

SUMMARY

Thus, a need exists for a door opening/closing device which is not suspectable to the drawback mentioned above.

A door opening/closing device according to an aspect of this disclosure includes: a resin-made base which is configured to be attached to an inner panel of a vehicle door; and a transfer mechanism which is provided on a vehicle interior surface side of the base, and transfers power to a locking device of the vehicle door via a power transfer cable by an operation of at least an inner handle, in which the base includes a first part in which the transfer mechanism is disposed, a second part in which the power transfer cable is disposed, and a fixing portion which fixes an outer casing end portion of the power transfer cable, and in which the first part and the second part are configured to locate at different levels from each other so that the second part is positioned closer to an inner side than the first part in a vehicle width direction, a step portion is provided between the first part and the second part, and the fixing portion is provided in the step portion.

A vehicle door module according to another aspect of this disclosure includes: the door opening/closing device; and a window glass raising/lowering device which raises and lowers a window glass, in which the window glass raising/lowering device and the door opening/closing device are disposed on the base.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

With reference to FIGS. 1 to 7, a vehicle door module will be described. In the following description, as an example of the vehicle door module, a vehicle door module (hereinafter, referred to as a "slide door module 30") which is attached to a slide type vehicle door (slide door) will be described.

Figure 1:
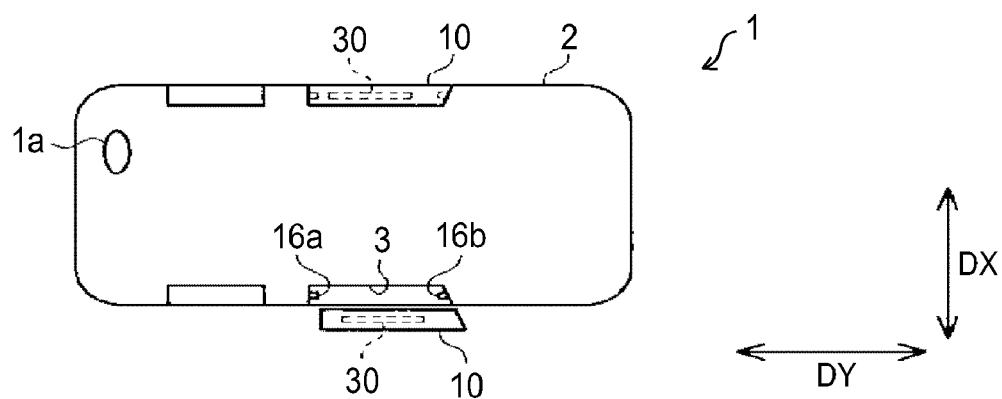
FIG. 1 is a schematic view of a vehicle.

FIG. 1 is an aerial plan view of a vehicle 1. In FIG. 1, a side where a steering wheel 1a is disposed is illustrated as a front side of the vehicle 1. In addition, in a state where a slide door 10 is attached to a vehicle main body 2, a direction which matches a vertical direction of the vehicle 1 is defined as a "vertical direction DZ" of the slide door module 30, a direction which matches a longitudinal direction of the vehicle 1 is defined as a "longitudinal direction DY" of the slide door module 30, and a direction which matches a vehicle width direction of the vehicle 1 is defined as a "vehicle width direction DX" of the slide door module 30.

The slide door 10 is attached to a platform 3 of the vehicle main body 2.

The slide door 10 moves within a range from a fully closed position at which the platform 3 is closed to a fully opened position at which the platform 3 is fully opened, along a door rail constructed in the vehicle main body 2. The slide door 10 is attached to the vehicle main body 2 to be movable in the vehicle width direction DX from the fully closed position, and to be movable in the longitudinal direction DY in a state of being moved to the outside from the fully closed position.

Figure 2:
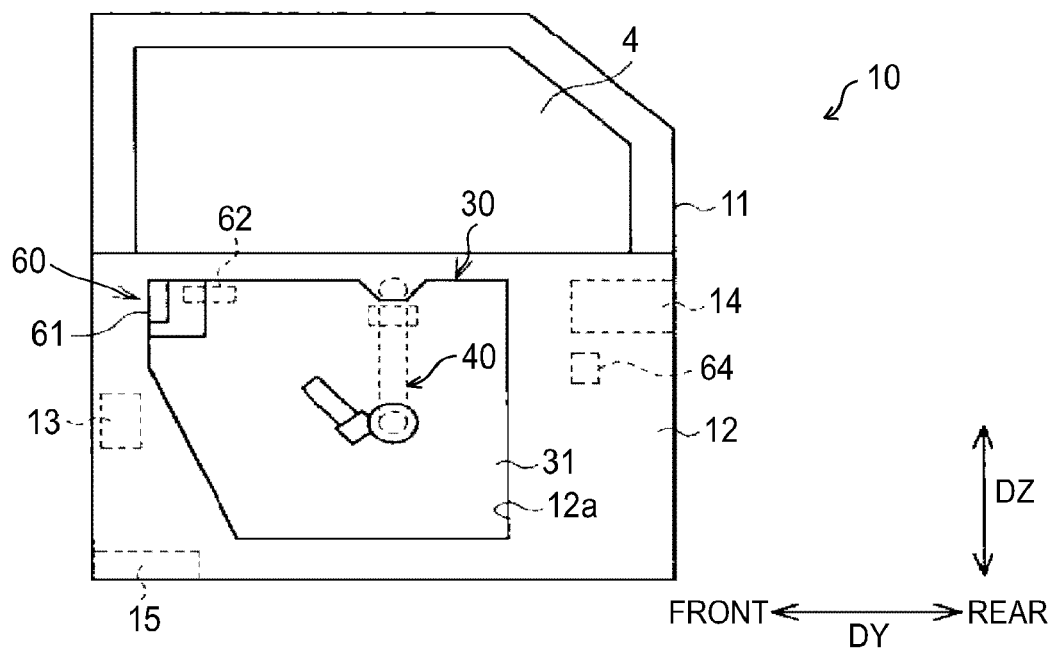
FIG. 2 is a schematic view of a slide door.

FIG. 2 is a schematic view illustrating a structure of the inside of the slide door 10.

The slide door 10 includes an outer panel 11, an inner panel 12, the slide door module 30 attached to the inner panel 12, and a window glass 4. An interior panel is attached to an inner side (vehicle interior side) of the inner panel 12.

The inner panel 12 is attached to the inner side of the outer panel 11. In the inner panel 12, an opening portion 12a in which the slide door module 30 is disposed is provided. The window glass 4 can be accommodated in a space between an inner member configured of the inner panel 12 and the slide door module 30, and the outer panel 11.

In the slide door 10, a first locking device 13 disposed on a front side of the slide door 10, a second locking device 14 disposed on a rear side of the slide door 10, and a third locking device 15 disposed in a lower portion of the slide door 10, are provided. The first to the third locking devices 13 to 15 are disposed between the outer panel 11 and the inner panel 12. Each of the first to the third locking devices 13 to 15 have a state (hereinafter, referred to as a "released state") where a striker can be inserted and removed, and a state (hereinafter, referred to as a "restrained state") where the striker is restrained.

The first locking device 13 is engaged with a striker 16a (refer to FIG. 1) provided in a front edge portion of the platform 3 of the vehicle main body 2.

The second locking device 14 is engaged with a striker 16b (refer to FIG. 1) provided in a rear edge portion of the platform 3 of the vehicle main body 2.

The third locking device 15 is engaged with a striker (not illustrated) provided in a lower edge portion of the platform 3 of the vehicle main body 2.

The slide door 10 is restrained by the first and the second locking devices 13 and 14 when the slide door 10 is positioned at the fully closed position. In addition, the slide door 10 is retrained by the third locking device 15 when the slide door 10 is positioned at the fully opened position. The movement of the slide door 10 is restricted as the slide door 10 is restrained by the first and the second locking devices 13 and 14, or by the third locking device 15.

Figure 3:
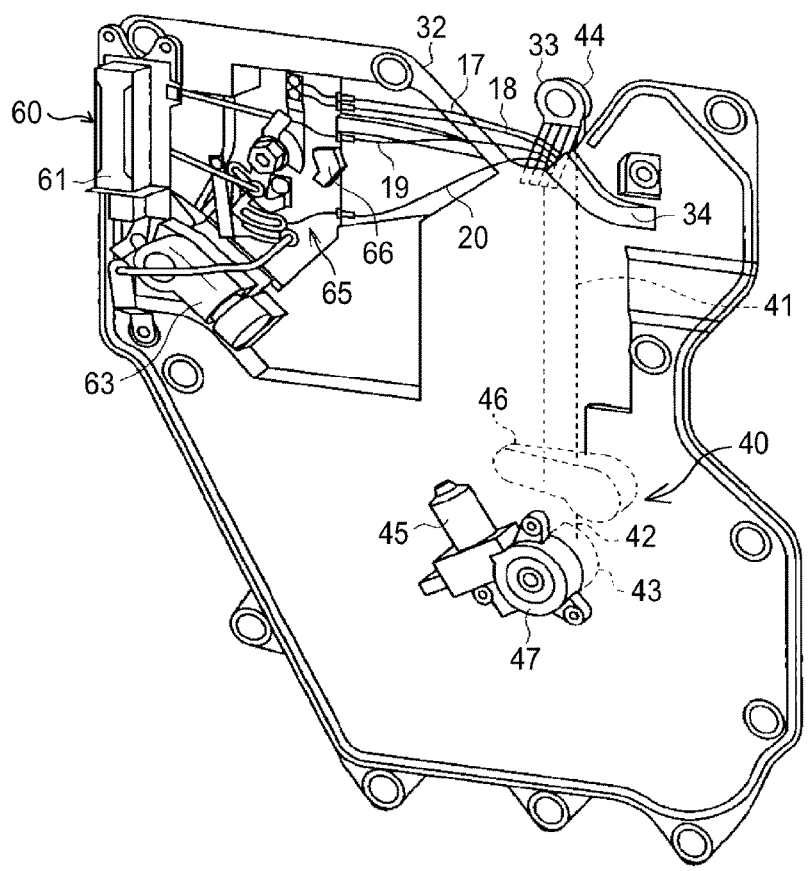
FIG. 3 is a perspective view of a slide door module.

With reference to FIG. 3, the slide door module 30 will be described.

The slide door module 30 includes a resin-made base 31, a window glass raising/lowering device 40 which raises and lowers the window glass 4, and a door opening/closing device 60 which operates the first to the third locking devices 13 to 15. The window glass raising/lowering device 40 and the door opening/closing device 60 are attached to the base 31.

The base 31 is formed of a resin. For example, the base 31 is formed of a foamed resin. Compared to a resin which is not foamed, by using the foamed resin, it is possible to increase the thickness of the base 31, and thus, to increase strength and rigidity of the base 31.

The window glass raising/lowering device 40 includes first and second cables 41 and 42 which tow the window glass 4, a drum 43 which winds the first and the second cables 41 and 42, a pulley 44 which pulls the first and the second cables 41 and 42 in cooperation with the drum 43, a window glass raising/lowering motor 45 which rotates the drum 43, and a carrier 46 which is attached to a lower end of the window glass 4.

The drum 43 and the pulley 44 are disposed on an outer surface of the base 31. The window glass raising/lowering motor 45 is disposed on an inner surface (a surface on the vehicle interior side in the vehicle width direction DX. The same hereinafter) of the base 31. The window glass raising/lowering motor 45 and the drum 43 are connected to each other via a speed reducer 47. In addition, an output shaft of the speed reducer 47 is inserted through a through hole provided in the base 31, and is connected to the drum 43.

The first cable 41 stretches to be folded back by the pulley 44. One end of the first cable 41 is connected to the drum 43, and the other end is connected to the carrier 46.

The second cable 42 stretches to extend in a direction opposite to the first cable 41 with respect to the carrier 46. One end of the second cable 42 is connected to the carrier 46, and the other end is connected to the drum 43.

When the first cable 41 or the second cable 42 is wound around the drum 43 by the rotation of the drum 43, the carrier 46 moves according to the movement of the first cable 41 and the second cable 42. Accordingly, the window glass 4 is raised and lowered within a predetermined moving range.

The door opening/closing device 60 includes an inner handle 61, a locking actuator 63, and a transfer mechanism 65 which operates the first to the third locking devices 13 to 15 based on various operations. An outer handle 62 (refer to FIG. 2) attached to the outer side of the slide door 10 is connected to the door opening/closing device 60. A releasing actuator 64 (refer to FIG. 2) which will be described later and is attached to the inner panel 12 is connected to the transfer mechanism 65 via a fourth power transfer cable 20.

The inner handle 61 is attached to the base 31 of the slide door module 30 to be rotatable. The inner handle 61 is provided to protrude to the inner side (seat side) in the vehicle width direction DX from an interior panel.

When the inner handle 61 rotates in a first direction D1 by a first predetermined operation (hereinafter, referred to as a "closing operation"), the rotation operation is transferred to the third locking device 15 via the transfer mechanism 65, and the third locking device 15 is operated by the transferred power. Accordingly, the third locking device 15 becomes released. For example, when the slide door 10 is restrained by the third locking device 15 at the fully opened position, the slide door 10 becomes movable by the closing operation of the inner handle 61.

When the inner handle 61 rotates in a second direction D2 by a second predetermined operation (hereinafter, referred to as a "opening operation"), the rotation operation is transferred to the first and the second locking devices 13 and 14 via the transfer mechanism 65, and each of the first and the second locking devices 13 and 14 is operated by the transferred power. Accordingly, the first and the second locking devices 13 and 14 become released. For example, when the slide door 10 is restrained by the first and the second locking devices 13 and 14 at the fully closed position, the slide door 10 becomes movable by the opening operation of the inner handle 61.

The outer handle 62 (refer to FIG. 2) is attached to the outer surface of the outer panel 11 to be rotatable. The rotation operation of the outer handle 62 is transferred to the transfer mechanism 65 via a lever and a pole.

When the outer handle 62 rotates in a predetermined direction by a pulling operation, the rotation operation is transferred to the first to the third locking devices 13 to 15, and the first to the third locking devices 13 to 15 are operated by the transferred power. Accordingly, the first to the third locking devices 13 to 15 become released. For example, when the slide door 10 is restrained at the fully closed position or at the fully opened position, the slide door 10 becomes movable by the pulling operation of the outer handle 62.

The locking actuator 63 makes the slide door 10 door-locked. The door-locked state illustrates a state where the slide door 10 cannot be moved from the fully closed position, even by the opening/closing operation of the inner handle 61 and the pulling operation of the outer handle 62.

The locking actuator 63 operates based on a lock-on operation of a locking switch, and moves a second engagement pin 88 which will be described later to a position where the rotation operations of the inner handle 61 and the outer handle 62 are not transferred to the first to the third locking devices 13 to 15.

The releasing actuator 64 maintains the released state of the first to the third locking devices 13 to 15 only during a predetermined period of time. Specifically, the releasing actuator 64 operates when a predetermined condition is established. According to this operation, a sixth lever 86, which will be described later, rotates via the fourth power transfer cable 20, first, third, and fourth levers 81, 83, and 84 rotate via a fifth lever 85, and the released state of the first to the third locking devices 13 to 15 is maintained. For example, the predetermined condition is for performing the opening/closing operation of the inner handle 61 or the pulling operation of the outer handle 62.

Figure 4:
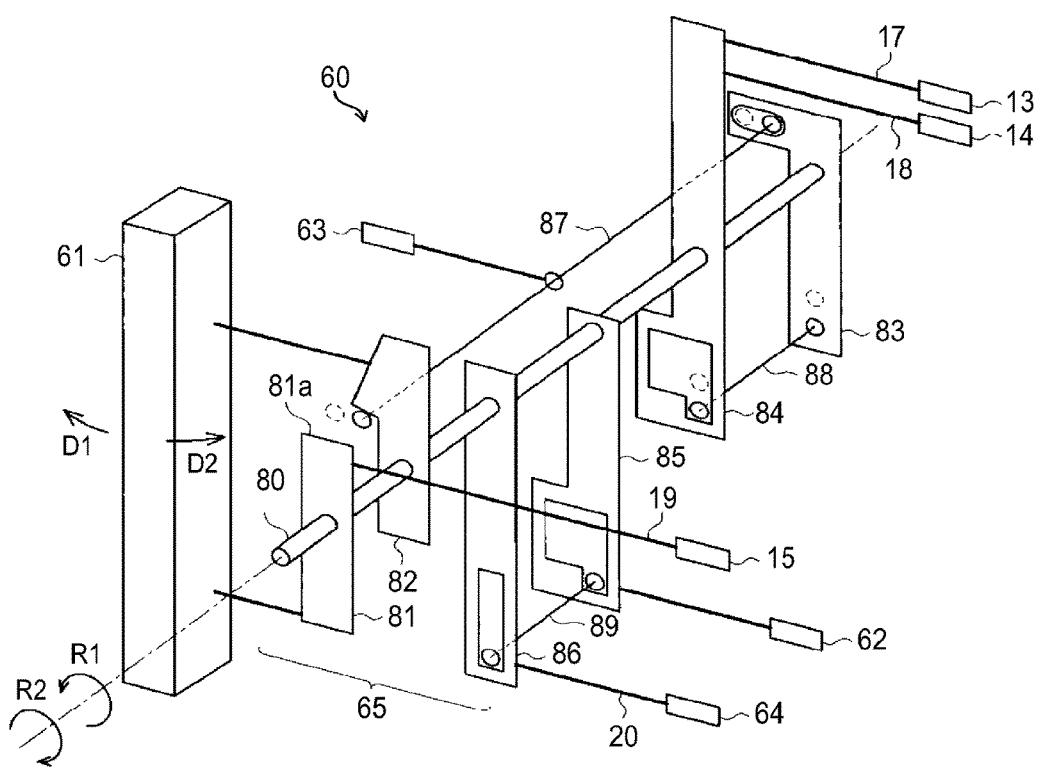
FIG. 4 is a schematic view of a door opening/closing device.

With reference to FIG. 4, the transfer mechanism 65 of the door opening/closing device 60 will be described.

The transfer mechanism 65 includes the first to the sixth levers 81 to 86, and first to the third engagement pins 87 to 89 which engage the predetermined levers with each other or release the engagement of the predetermined levers. The first to the sixth levers 81 to 86 are attached to be rotatable to a spindle 80 fixed to the base 31 of the slide door module 30. The spindle 80 is fixed to the base 31 via a metal bracket. The first to the sixth levers 81 to 86 are biased in a second rotating direction R2 (a rotating direction opposite to a first rotating direction R1 which will be described later) by a spring or the like.

The first lever 81 is connected to the inner handle 61 to be interlocked with the rotation operation in the first direction D1 of the inner handle 61, and is connected to the third locking device 15 via a third power transfer cable 19. In other words, the first lever 81 rotates in the first rotating direction R1 in accordance with the rotation operation in the first direction D1 of the inner handle 61, and makes the third locking device 15 released. In addition, as an end portion 81a of the first lever 81 and a spring locking portion 35e (refer to FIG. 5) provided in the base 31 are connected to each other by a coil spring, the first lever 81 is biased in the second rotating direction R2.

A second lever 82 is connected to the inner handle 61 to be interlocked with the rotation operation in the first direction D1 and the second direction D2 of the inner handle 61, and is interlocked with the third lever 83 via the first engagement pin 87.

The third lever 83 is linked to the second lever 82 via the first engagement pin 87, and is linked to a fourth lever 84 via the second engagement pin 88.

The fourth lever 84 is linked to the third lever 83 via the second engagement pin 88, and connected to each of the first locking device 13 and the second locking device 14 via first and second power transfer cables 17 and 18.

The fifth lever 85 is connected to the outer handle 62 to be interlocked with the rotation operation of the outer handle 62, and is linked to the sixth lever 86 via the third engagement pin 89. In addition, the fifth lever 85 has a structure of being engaged with the first lever 81 and the third lever 83 when the fifth lever 85 rotates in the first rotating direction R1. In other words, when the fifth lever 85 rotates in the first rotating direction R1 by the rotation operation of the outer handle 62, being interlocked with this, the first lever 81 and the third lever 83 rotate in the first rotating direction R1.

The sixth lever 86 is connected to the releasing actuator 64 via the fourth power transfer cable 20, and is linked to the fifth lever 85 via the third engagement pin 89.

In other words, when the sixth lever 86 rotates by the releasing actuator 64, being interlocked with this, the fifth lever 85 rotates.

The first engagement pin 87 moves based on a predetermined operation (child locking operation) of a child locking switch, and makes the second lever 82 and the third lever 83 linked or un-linked to each other. In addition, the linked state illustrates a state where the second lever 82 and the third lever 83 are linked to each other, and the un-linked state illustrates a state where the second lever 82 and the third lever 83 rotate independently of each other. The linked state and the un-linked state are illustrated the same in the following description.

The second engagement pin 88 moves by the operation of the locking actuator 63 based on the lock-on operation or the lock-off operation of the locking switch, and makes the third lever 83 and the fourth lever 84 be in a linked state or in a un-linked state.

The third engagement pin 89 is disposed at a position where the fifth lever 85 and the sixth lever 86 are linked to each other. In addition, based on the predetermined operation, the third engagement pin 89 moves to a position (hereinafter, referred to as a "non-engaged position") where the fifth lever 85 and the sixth lever 86 are not linked to each other. In addition, the predetermined operation is performed for moving the third engagement pin 89 to the non-engaged position when it is necessary to perform the rotation operations the fifth lever 85 and the sixth lever 86 independently of each other, for example, when the releasing actuator 64 does not operate.

The transfer mechanism 65 operates as follows.

When the inner handle 61 rotates in the first direction D1, the first lever 81 rotates in the first rotating direction R1. By the rotation of the first lever 81, the power of the first lever 81 is transferred to the third locking device 15 via the third power transfer cable 19, the third locking device 15 operates, and the third locking device 15 becomes released. In other words, as the inner handle 61 is rotated in the first direction D1, the slide door 10 which is restrained by the third locking device 15 at the fully opened position becomes movable.

When the inner handle 61 rotates in the second direction D2, the second lever 82 rotates in the first rotating direction R1. When the second lever 82, the third lever 83, the fourth lever 84 are linked to one another via the first engagement pin 87 and the second engagement pin 88, the fourth lever 84 rotates being interlocked with the rotation of the second lever 82. The power of the fourth lever 84 is transferred to the first and the second locking devices 13 and 14 via the first and the second power transfer cable 17 and 18, and the first and the second locking devices 13 and 14 become released. In other words, as the inner handle 61 is rotated in the second direction D2, the slide door 10 which is restrained by the first and the second locking devices 13 and 14 at the fully closed position becomes movable.

When at least one of the un-linked state between the second lever 82 and the third lever 83, and the un-linked state between the third lever 83 and the fourth lever 84 is established, the rotation operation of the second lever 82 is not transferred to the fourth lever 84. For this reason, even when the inner handle 61 rotates in the second direction D2, the first and the second locking devices 13 and 14 do not operate. For this reason, in this case, even when the inner handle 61 is rotated in the second direction D2 in a case where the slide door 10 is at the fully closed position, the restrained state of the slide door 10 by the first and the second locking devices 13 and 14 is maintained.

When the outer handle 62 rotates, the fifth lever 85 rotates in the first rotating direction R1. When the fifth lever 85 rotates in the first rotating direction R1, the fifth lever 85 is engaged with the first lever 81 and the third lever 83. For this reason, being interlocked with the fifth lever 85, the first lever 81 and the third lever 83 rotate. When the third lever 83 and the fourth lever 84 are linked to each other, being interlocked with the fifth lever 85, the first lever 81 and the fourth lever 84 operate. The operation of the first lever 81 is transferred to the third locking device 15 via the third power transfer cable 19, and the third locking device 15 becomes released. Since the operation of the fourth lever 84 is transferred to the first and the second locking devices 13 and 14 via the first and the second power transfer cables 17 and 18, the first and the second locking devices 13 and 14 become released. In other words, the first to the third locking devices 13 to 15 become released, and the slide door 10 restrained at the fully closed position or the fully opened position becomes movable. Since the fourth lever 84 does not perform the rotation operation when the third lever 83 and the fourth lever 84 are not linked to each other, even when the outer handle 62 is rotated when the slide door 10 is at the fully closed position, the restrained state of the slide door 10 by the first and the second locking devices 13 and 14 is maintained.

In addition, when the inner handle 61 and the outer handle 62 perform the rotation operation, the releasing actuator 64 operates, and the sixth lever 86 rotates. Since the fifth lever 85 rotates in the first rotating direction R1 according to the rotation of the sixth lever 86, being interlocked with this, the released state of the first to the third locking devices 13 to 15 is maintained for the predetermined period of time. Accordingly, since the first to the third locking devices 13 to 15 become released during the predetermined period of time, the movement of the slide door 10 from the restrained state at the fully closed position or the fully opened position becomes smooth.

With reference to FIG. 3, the disposition of each device will be described.

In the base 31, a notch portion 32 having a structure where an upper edge is cut out is provided. In the notch portion 32, a supporting portion 33 which supports the pulley 44 of the window glass raising/lowering device 40 is provided to protrude.

In an upper portion of the base 31, that is, in the vicinity of the notch portion 32, a guidance groove 34 which guides the wiring that extends from each device, and the power transfer cables 17 to 20, is provided. The guidance groove 34 is configured to be recessed on the inner side in the vehicle width direction DX from the outer surface of the base 31.

On the inner surface side in the center lower portion of the base 31, the window glass raising/lowering motor 45 and the speed reducer 47 are disposed, and on the outer surface side, the drum 43 of the window glass raising/lowering device 40 is disposed.

On the inner surface side of the upper front portion of the base 31, the inner handle 61, the door opening/closing device 60, and a part of the power transfer cables 17 to 20 are disposed.

Figure 5:
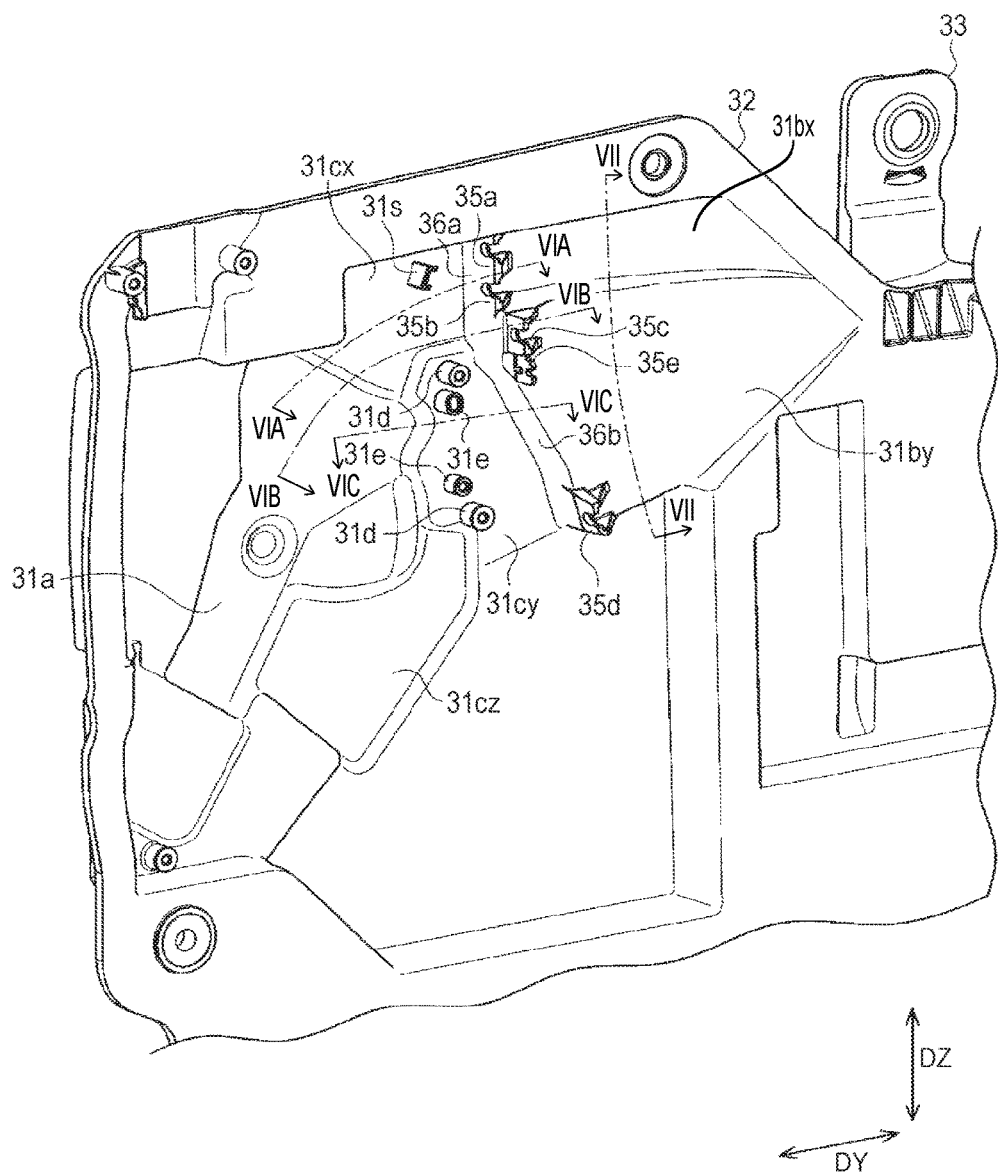
FIG. 5 is a partial perspective view of the base.
Figure 6A:
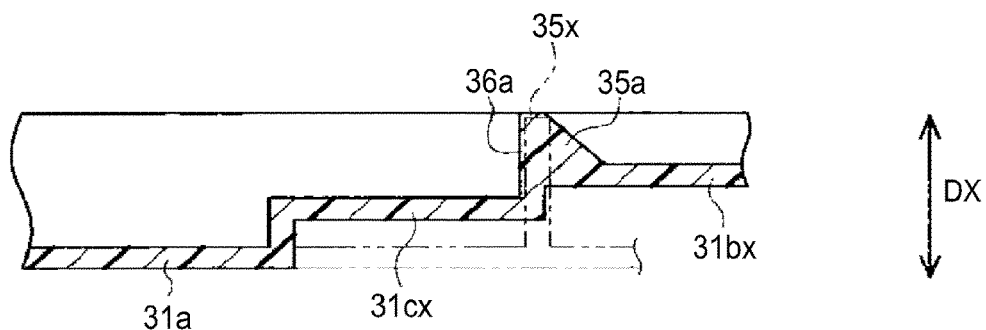
FIG. 6A is a schematic sectional view along line VIA-VIA of FIG. 5.
Figure 6B:
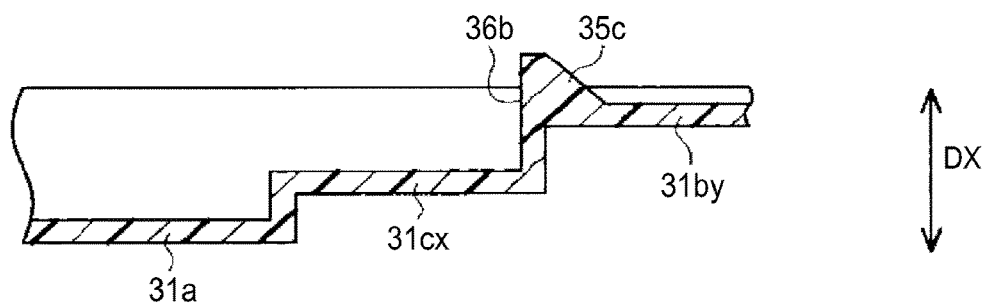
FIG. 6B is a schematic sectional view along line VIB-VIB of FIG. 5.
Figure 6C:
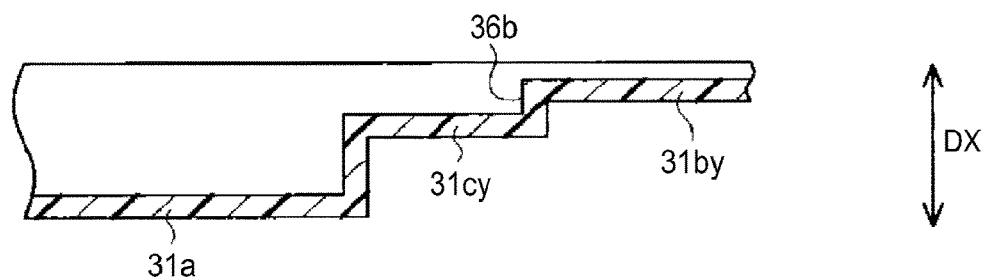
FIG. 6C is a schematic sectional view along line VIC-VIC of FIG. 5.
Figure 7:
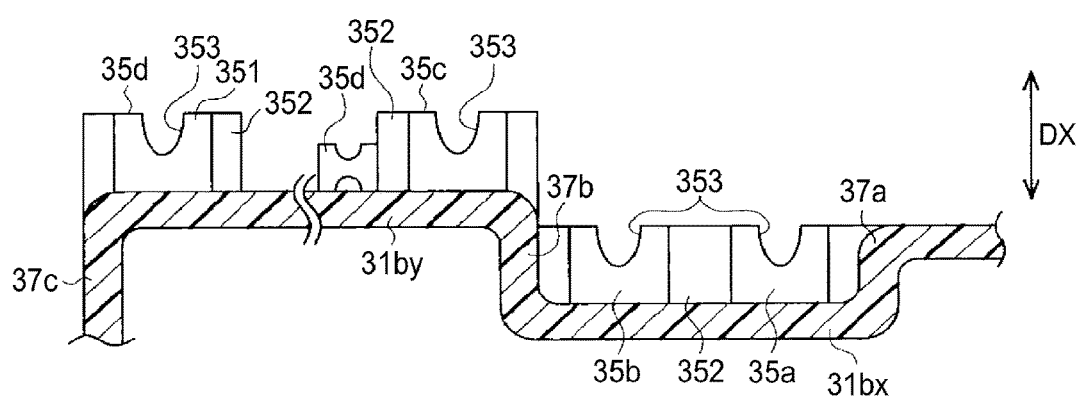
FIG. 7 is a schematic sectional view along line VII-VII of FIG. 5.

With reference to FIGS. 5 to 7, a structure of the upper front portion of the base 31 will be described.

The upper front portion of the base 31 includes a first part 31a in which the transfer mechanism 65 of the door opening/closing device 60 is disposed, intermediate parts 31cx, 31cy, and 31cz which are disposed on the periphery of the first part 31a, and second parts 31bx and 31by disposed at a rear part (a side opposite to the first part 31a side in the intermediate parts 31cx and 31cy) of the intermediate parts 31cx and 31cy. The second parts 31bx and 31by are divided into two parts.

In one second part 31bx, the first and the second power transfer cables 17 and 18 are disposed. In the other second part 31 by, the third and the fourth power transfer cables 19 and 20 are disposed. In addition, the one second part 31bx is positioned above the other second part 31by.

In the intermediate part 31cx, a stopper 31s which regulates the rotation of the fourth lever 84 in the second rotating direction R2 at the predetermined position, is provided.

In the intermediate part 31cy, a position detection switch 66 (refer to FIG. 3) for detecting the rotation position of a lever of the transfer mechanism 65 is disposed. In the intermediate part 31cy, a fixing boss 31d for fixing the position detection switch 66 by a screw, and a positioning boss 31e which positions the position detection switch 66, are provided. The positioning boss 31e protrudes from the base 31. On an end surface of the positioning boss 31e, a hole which accommodates a projection that protrudes from the position detection switch 66 is provided. In addition, instead of this configuration, the positioning boss 31e can be provided as a projection without a hole. In this case, the positioning boss 31e is disposed on a linking line that links two fixing bosses 31d to each other, and is configured to be engaged with the projection of the position detection switch 66. The positioning boss 31e stops the rotation of the position detection switch 66 when fastening the screw, and positions the position detection switch 66 at an appropriate angle.

The intermediate part 31cz supports the outer side surface (surface on the base 31 side) of a lever disposed on the outermost side from among the levers 81 to 86 of the transfer mechanism 65, that is, the third lever 83. For example, when the third lever 83 rotates, the intermediate part 31cz is configured so that the outer side surface of the third lever 83 slides on the intermediate part 31cz. Otherwise, the intermediate part 31cz is configured so that the outer side surface of the third lever 83 is in contact with the intermediate part 31cz when the spindle 80 is inclined.

As illustrated in FIGS. 6A to 6C, the first part 31a, the intermediate parts 31cx, 31cy, and 31cz, and the second parts 31bx and 31by are configured to locate at different levels from one another, and are aligned to be oriented toward the inner side in the vehicle width direction DX in this order. In other words, the intermediate parts 31cx and 31cy are disposed further on the inner side in the vehicle width direction DX than the first part 31a, and the second parts 31bx and 31by are disposed further on the inner side in the vehicle width direction DX than the intermediate parts 31cx, 31cy, and 31cz.

In step portions 36a and 36b between the second parts 31bx and 31by and the intermediate parts 31cx and 31cy, first to fourth fixing portions 35a to 35d, and the above-described spring locking portion 35e for fixing an end portion (hereinafter, referred to as an "outer casing end portion") of the outer casing are provided to protrude to the inner side in the vehicle width direction DX. The first to the fourth fixing portions 35a to 35d, and the spring locking portion 35e are formed of a resin integrally with the base 31. In addition, the first to the fourth fixing portions 35a to 35d, and the spring locking portion 35e are disposed on the rear side of the transfer mechanism 65.

The first to the fourth power transfer cables 17 to 20 are respectively fixed to the first to the fourth fixing portions 35a to 35d. The first to the fourth fixing portions 35a to 35d and the first to the fourth power transfer cables 17 to 20 are associated with each other, but a mistake in attachment can be generated. For this reason, in the vicinity (second parts 31bx and 31by) of each of the first to the fourth fixing portions 35a to 35d, a mark which shows a cable to be a target to be fixed is engraved. For example, when the first to the fourth power transfer cables 17 to 20 are given different colors, a character which shows the color of a cable to be a target to be fixed is engraved.

However, as a fixing structure of the outer casing end portion, the following reference example is possible.

As illustrated by two-dot chain line in FIG. 6A, a fixing portion 35x can be provided to protrude from an extended part of the first part 31a (for example, can be configured as a rib). However, the fixing portion 35x in this case becomes longer in the vehicle width direction DX compared to the first to the fourth fixing portions 35a to 35d illustrated in the embodiment. For this reason, in a case where a force applied to a base portion of the fixing portion 35x increases when the inner cable is drawn out of the outer casing, there is a concern that the fixing portion 35x is folded or bent. In this regard, since the first to the fourth fixing portions 35a to 35d are provided at the step portions 36a and 36b so as to be shorter compared to the fixing portion 35x of the reference example, generation of folding or bending is suppressed.

As illustrated in FIG. 7, the first to the fourth fixing portions 35a to 35d include an engagement portion 351 with which the outer casing end portion is engaged, and a reinforcing portion 352 which reinforces the engagement portion 351. In the engagement portion 351, an engagement recessed portion 353 to which the outer casing end portion is fit is provided. The reinforcing portion 352 extends along the extending direction of the power transfer cables 17 to 20. The reinforcing portion 352 prevents the first to the fourth fixing portions 35a to 35d from falling down or being bent.

As illustrated in FIG. 5, in the step portion (hereinafter, referred to as a "first step portion 36a") of the second part 31bx in which the first and the second power transfer cables 17 and 18 are disposed, the first fixing portion 35a and the second fixing portion 35b are disposed adjacent to each other. In addition, at the second part 31bx, side walls 37a and 37b are provided on both sides of the part where the first and the second power transfer cables 17 and 18 are disposed (refer to FIG. 7). The side walls 37a and 37b are provided to protrude to the inner side in the vehicle width direction DX and to be along the extending direction of the power transfer cables 17 and 18. In addition, the end portions on the transfer mechanism 65 side of the one pair of side walls 37a and 37b are linked to each other by the first and the second fixing portions 35a and 35b which function as a connection portion (refer to FIG. 5).

In addition, in the step portion (hereinafter, referred to as a "second step portion 36b") of the second part 31by in which the third and the fourth power transfer cables 19 and 20 are disposed, a third fixing portion 35c and a fourth fixing portion 35d are disposed to be separated from each other. In addition, at the second part 31by, the side walls 37b and 37c are provided on both sides where the third and the fourth power transfer cables 19 and 20 are disposed (refer to FIG. 7). The side walls 37b and 37c are provided to protrude to the outer side in the vehicle width direction DX with respect to the second part 31by, and to be along the extending direction of the power transfer cables 19 and 20. In addition, the end portions on the transfer mechanism 65 side of one pair of side walls 37b and 37c are linked to each other by a connection portion wall (second step portion 36b) (refer to FIG. 5).

In addition, in the embodiment, the side wall 37b provided between the second part 31bx in which the first and the second power transfer cables 17 and 18 are disposed, and the second part 31by in which the third and the fourth power transfer cables 19 and 20 are disposed, is a side wall of the second part 31bx, and is also a side wall of the second part 31by.

In addition, as illustrated in FIG. 5, the first step portion 36a and the second step portion 36b are connected to each other, and configures a wall (bent wall) which is bent. For example, the wall which is configured of the first step portion 36a and the second step portion 36b is bent in the vicinity of the third fixing portion 35c.

Next, effects of the slide door module 30 according to the embodiment will be described.

(1) In the above-described embodiment, the base 31 is formed of a resin.

The base 31 includes the first part 31a in which the transfer mechanism 65 is disposed, the second part 31bx in which the first and the second power transfer cables 17 and 18 are disposed, and the first and the second fixing portions 35a and 35b which fix the outer casing end portions of the first and the second power transfer cables 17 and 18. The first part 31a and the second part 31bx are configured to locate at different levels from each other, and the second part 31bx is positioned further on the inner side than the first part 31a in the vehicle width direction DX. In addition, the first and the second fixing portions 35a and 35b are provided in the first step portion 36a.

In addition, the base 31 further includes the second part 31by in which the third and the fourth power transfer cables 19 and 20 are disposed, and the third and the fourth fixing portions 35c and 35d which fix the outer casing end portions of the third and the fourth power transfer cables 19 and 20. The first part 31a and the second part 31by are configured to locate at different levels from each other, and the second part 31by is positioned further on the inner side than the first part 31a in the vehicle width direction DX. In addition, the third and the fourth fixing portions 35c and 35d are provided in the second step portion 36b.

According to this configuration, since the base 31 is made of a resin, compared to the slide door module 30 having a structure in the related art, the weight of the slide door module 30 (vehicle door module) is lighter.

In addition, since the first to the fourth fixing portions 35a to 35d which fix the outer casing end portions are provided in the first and the second step portions 36a and 36b, compared to a structure (refer to the two-dot chain line in FIG. 6A) in which the first to the fourth fixing portions 35a to 35d are provided at the same position as the first part 31a, the length (length in the vehicle width direction DX) of the first to the fourth fixing portions 35a to 35d becomes shorter.

A force is applied to the fixing portions 35a to 35d when the inner cable of the power transfer cables 17 to 20 are drawn out of the outer casing, but since the force applied to the base portion of the fixing portions 35a to 35d is weak when the fixing portions 35a to 35d are short as in the above-described configuration, folding or bending of the fixing portions 35a to 35d is suppressed. Accordingly, deterioration of the fixing portions 35a to 35d which can be generated as the accumulated number of the operations of the inner handle 61 increases is suppressed.

(2) In the above-described embodiment, at the second part 31bx, one pair of side walls 37a and 37b along the extending direction of the power transfer cables 17 and 18 is provided, and the end portions on the transfer mechanism 65 side of one pair of side walls 37a and 37b are linked to each other by the first and the second fixing portions 35a and 35b. Similarly, at the second part 31by, one pair of side walls 37b and 37c along the extending direction of the power transfer cables 19 and 20 is provided, and the end portions on the transfer mechanism 65 side of the one pair of side walls 37b and 37c are linked to each other by the second step portion 36b (wall).

According to this configuration, a box structure in which one surface is opened is configured of the second part 31bx, the one pair of side walls 37a and 37b, and the first and the second fixing portions 35a and 35b. Similarly, a box structure in which one surface is opened is configured of the second part 31by, one pair of side walls 37b and 37c, and the second step portion 36b. According to the box structure, since the entire second parts 31bx and 31by are reinforced, deformation of the base 31 which can be generated by drawing out the inner cable is suppressed.

(3) In the above-described embodiment, the one pair of side walls 37a and 37b (37b and 37c) extends along the power transfer cables 17 and 18 (19 and 20).

When the inner cable of the power transfer cables 17 and 18 (19 and 20) is drawn out of the outer casing by the transfer mechanism 65, stress is applied in a direction along the extending direction of the power transfer cables 17 and 18 (19 and 20) to the first and the second fixing portions 35a and 35b.

In the above-described configuration, since the side walls 37a and 37b (37b and 37c) extend to the power transfer cables 17 and 18 (19 and 20), the stress acts in the extending direction of the side walls 37a and 37b (37b and 37c). In other words, since the force acts in a direction (extending direction of the side walls 37a, 37b, and 37c) in which the rigidity becomes higher at the second part 31bx (31by), deformation of the second part 31bx (31by) is suppressed.

(4) In the above-described embodiment, the intermediate parts 31cx and 31cy are interposed between the first part 31a and the second parts 31bx and 31by of the base 31. These parts are configured to locate at different levels from one another to be oriented toward the inner side in the vehicle width direction DX in an order of the first part 31a, the intermediate parts 31cx and 31cy, and the second parts 31bx and 31by.

When the step portions 36a and 36b are long, there is a concern that deformation or torsion in the step portions 36a and 36b increases, the orientation of the fixing portions 35a to 35d changes, and slidability (smooth movement) of the inner cable deteriorates. In this regard, in the above-described configuration, as the intermediate parts 31cx and 31cy are interposed between the first part 31a and the second parts 31bx and 31by, the length (length in the vehicle width direction DX) of each of the step portions 36a and 36b decreases. Therefore, deformation of the step portions 36a and 36b is suppressed, and deterioration of slidability of the inner cable is suppressed.

(5) In the above embodiment, the plurality of fixing portions 35a to 35d are provided in the base 31, and a bent wall is formed by connecting the first step portion 36a and the second step portion 36b to each other.

A force is applied to the fixing portions 35a to 35d when the inner cable is drawn out of the outer casing by the transfer mechanism 65. When the step portions 36a and 36b are deformed as the force is transferred to the step portions 36a and 36b, there is a concern that the positions of the fixing portions 35a to 35d are shifted, and slidability of the inner cable deteriorates.

In this regard, according to the above-described configuration, a wall which extends in a shape of a straight line by the first step portion 36a and the second step portion 36b is not configured, and a wall which is bent in the middle by the first step portion 36a and the second step portion 36b is configured. For this reason, in a case where the force which acts when the inner cable is drawn out of the outer casing is transferred to one of the first and the second step portions 36a and 36b, the force is dispersed by the bent part. Therefore, deformation or bending of the other step portions 36a and 36b is suppressed, and the shift of the positions of the fixing portions 35a to 35d is suppressed. Accordingly, deterioration of slidability of the inner cable is suppressed.

(6) In the above-described embodiment, the slide door module 30 (vehicle door module) includes the door opening/closing device 60 and the window glass raising/lowering device 40, and the window glass raising/lowering device 40 and the door opening/closing device 60 are disposed on the base 31.

In the configuration, since the window glass raising/lowering device 40 and the door opening/closing device 60 are disposed on the base 31, compared to a case where the devices are separately attached to the inner panel 12, work of attaching the devices to the inner panel 12 becomes simple.

In addition, other embodiments will be described.

In the above-described embodiment, a device which is different from the above-described devices can be attached to the base 31 of the slide door module 30. For example, an acoustic speaker unit can be attached.

In the above-described embodiment, the door opening/closing device 60 includes the plurality of levers 81 to 86, but the structure of the door opening/closing device 60 is not limited thereto. In addition, the structure of the inner handle 61 is also not limited to the embodiment.

In the above-described embodiment, the slide door module 30 is described as an example, but the technology is also employed in the door opening/closing device which is not modularized. For example, the door opening/closing device includes the resin-made base 31, the door opening/closing device 60, and the fixing portions for fixing the power transfer cables 17 to 20. The fixing portions has a structure according to the embodiment. According to the door opening/closing device, the effects according to the above-described (1) to (5) can be achieved.

(1) A door opening/closing device according to an aspect of this disclosure includes: a resin-made base which is attached to an inner panel of a vehicle door; and a transfer mechanism which is provided on a vehicle interior surface side of the base, and transfers power to a locking device of the vehicle door via a power transfer cable by an operation of at least an inner handle, in which the base includes a first part in which the transfer mechanism is disposed, a second part in which the power transfer cable is disposed, and a fixing portion which fixes an outer casing end portion of the power transfer cable, and in which the first part and the second part are configured to locate at different levels from each other so that the second part is positioned closer to an inner side than the first part in a vehicle width direction, a step portion is provided between the first part and the second part, and the fixing portion is provided in the step portion.

According to this configuration, since the base is made of a resin, compared to a door opening/closing device having a structure in the related art, the weight of the door opening/closing device is lighter. In addition, since the fixing portion which fixes the outer casing end portion is provided in the step portion between the first part and the second part, compared to a structure where the fixing portion is provided at the same position as the first part, the length (length in the vehicle width direction) of the fixing portion becomes shorter. A force is applied to the fixing portion when the inner cable of the power transfer cable is drawn out of the outer casing, but since the force applied to a base portion of the fixing portion becomes smaller when the fixing portion is short in the above-described configuration, folding or bending of the fixing portion is suppressed. Accordingly, deterioration of the fixing portion, which can be generated as the accumulated number of the operations of the inner handle increases, is suppressed.

(2) In the door opening/closing device, at the second part, one pair of side walls may be provided along an extending direction of the power transfer cable, and end portions on the transfer mechanism side of the one pair of side walls may be connected to each other by a connection portion.

According to this configuration, a box structure in which one surface is opened is configured of the second part, the one pair of side walls, and the fixing portion (or wall portion). Accordingly, since the entire second part is reinforced, deformation of the base, which can be generated by the movement or the like of the inner cable, is suppressed.

(3) In the door opening/closing device, the connection portion may be the fixing portion.

(4) In the door opening/closing device, the one pair of side walls may extend along the power transfer cable.

When the inner cable of the power transfer cable is drawn out of the outer casing, stress in a direction along the extending direction of the power transfer cable is applied to the fixing portion. In this configuration, since the side wall extends to the power transfer cable, the force acts in the extending direction of the side wall. In other words, since the stress acts in a direction (extending direction of the side wall) in which the rigidity becomes higher at the second part, deformation of the second part is suppressed.

(5) In the door opening/closing device, an intermediate part may be interposed between the first part and the second part, the first part, the second part, and the intermediate part may be configured to locate at different levels from one another to be oriented toward an inner side in the vehicle width direction in an order of the first part, the intermediate part, and the second part.

When the step portion is long, there is a concern that deformation or torsion in the step portion increases, the orientation of the fixing portion changes, and slidability (smooth movement) of the inner cable deteriorates. In this regard, in the above-described configuration, as the intermediate part is interposed between the first part and the second part, the length (length in the vehicle width direction) of each step portion decreases. Therefore, deformation of the step portion is suppressed, and deterioration of slidability of the inner cable is suppressed.

(6) In the door opening/closing device, a plurality of fixing portions may be provided on the base, the step portion may include a first step portion in which at least one of the fixing portions is disposed and a second step portion in which a fixing portion different from the fixing portion disposed in the first step portion is disposed, and a bent wall may be configured by connecting the first step portion and the second step portion to each other.

According to this configuration, the wall which extends in a shape of a straight line by the first step portion and the second step portion is not configured, and a wall which is bent in the middle by the first step portion and the second step portion is configured. For this reason, in a case where the force which acts when the inner cable is drawn out of the outer casing is transferred to one of the first step portion and the second step portion, the force is dispersed by the bent part. Therefore, deformation or bending of the other step portion is suppressed, and the shift of the position of the fixing portion is suppressed. Accordingly, deterioration of slidability of the inner cable is suppressed.

(7) A vehicle door module according to another aspect of this disclosure includes: the door opening/closing device; and a window glass raising/lowering device which raises and lowers a window glass, in which the window glass raising/lowering device and the door opening/closing device are disposed on the base.

In this configuration, since the window glass raising/lowering device and the door opening/closing device are disposed on the base, compared to a case where the devices are separately attached to the inner panel, work of attaching the devices to the inner panel becomes simple.

The door opening/closing device and the vehicle door module according to the aspects of this disclosure are lighter compared to the structure in the related art.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A door opening and closing device comprising:
    a resin-made base which is configured to be attached to an inner panel of a vehicle door; and
    a transfer mechanism which is provided on a vehicle interior surface side of the base, and transfers power to a locking device of the vehicle door via a power transfer cable by an operation of at least an inner handle,
    wherein the base includes a first part in which the transfer mechanism is disposed, a second part in which the power transfer cable is disposed, and a fixing portion including an engagement portion which engages with an outer casing end portion of the power transfer cable, and
    wherein the first part and the second part are configured to locate at different levels from each other so that the second part is positioned closer to an inner side than the first part in a vehicle width direction and the fixing portion protrudes from a surface of the second part.

2. The door opening and closing device according to claim 1,
    wherein, at the second part, one pair of side walls is provided along an extending direction of the power transfer cable, and end portions on the transfer mechanism side of the one pair of side walls are connected to each other by a connection portion.

3. The door opening and closing device according to claim 2,
    wherein the connection portion is the fixing portion.

4. A vehicle door module comprising:
    a door opening and closing device including:
    a resin-made base which is configured to be attached to an inner panel of a vehicle door; and
    a transfer mechanism which is provided on a vehicle interior surface side of the base, and transfers power to a locking device of the vehicle door via a power transfer cable by an operation of at least the inner handle,
    wherein the base includes a first part in which the transfer mechanism is disposed, a second part in which the power transfer cable is disposed, and a fixing portion including an engagement portion which engages with an outer casing end portion of the power transfer cable, and
    wherein the first part and the second part are configured to locate at different levels from each other so that the second part is positioned closer to an inner side than the first part in a vehicle width direction and the fixing portion protrudes from a surface of the second part; and
    a window glass raising and lowering device which raises and lowers a window glass,
    wherein the window glass raising and lowering device and the door opening and closing device are disposed on the base.

5. The door opening and closing device according to claim 2,
    wherein the one pair of side walls extend along the power transfer cable.

6. The door opening and closing device according to claim 1,
  wherein an intermediate part is interposed between the first part and the second part, the first part, the second part, and the intermediate part are configured to locate at different levels from one another to be oriented toward an inner side in the vehicle width direction in an order of the first part, the intermediate part, and the second part.

7. The door opening and closing device according to claim 1,
  wherein a plurality of the fixing portions are provided on the base,
  wherein the step portion includes a first step portion in which at least one of the fixing portions is disposed and a second step portion in which a fixing portion different from the fixing portion disposed in the first step portion is disposed, and a bent wall is configured by connecting the first step portion and the second step portion to each other.

8. The door opening and closing device according to claim 2,
  wherein the connection portion includes an engagement recessed portion to which the outer casing end portion is fit.

9. The door opening and closing device according to claim 1,
  wherein the fixing portion forms a tapered portion in a protrusion direction.

* * * * *